(12) United States Patent
Colbourne (10) Patent No.: US 7,077,026 B2
(45) Date of Patent: Jul. 18, 2006

(54) GEAR TOOTH PROFILE CURVATURE

(75) Inventor: John R. Colbourne, St. Albert (CA)

(73) Assignee: Genesis Partners, L.P., Montgomeryville, PA (US)

( * ) Notice: Subject to any disclaimer, the term of this patent is extended or adjusted under 35 U.S.C. 154(b) by 0 days.

(21) Appl. No.: 11/016,029

(22) Filed: Dec. 17, 2004

(65) Prior Publication Data

US 2005/0132836 A1    Jun. 23, 2005

Related U.S. Application Data

(60) Provisional application No. 60/530,752, filed on Dec. 18, 2003.

(51) Int. Cl.
*F16H 55/08* (2006.01)
*F16H 55/17* (2006.01)
*F16H 55/06* (2006.01)

(52) U.S. Cl. .................. 74/457; 74/459.5; 74/460; 74/462

(58) Field of Classification Search .................. 74/457, 74/459.5, 460, 462
See application file for complete search history.

(56) References Cited

U.S. PATENT DOCUMENTS

| 466,923 A | 1/1892 | Price |
|---|---|---|
| 1,313,035 A | 8/1919 | Williams |
| 1,425,144 A | 8/1922 | Schmick |
| 1,601,750 A | 10/1926 | Wildhaber |
| 1,613,702 A | 1/1927 | Hammar |
| 1,772,986 A | 8/1930 | Dunham |
| 1,973,185 A | 9/1934 | Trbojevich |
| 2,031,888 A | 2/1936 | Hill |
| 2,071,317 A | 2/1937 | Barkley |
| 2,091,317 A | 8/1937 | Hill |
| 2,207,290 A | 7/1940 | Hale |
| 2,230,418 A | 2/1941 | Wildhaber |
| 2,308,558 A | 1/1943 | Wildhaber |
| 2,436,231 A | 2/1948 | Schellens |
| 2,686,155 A | 8/1954 | Willis et al. |

(Continued)

FOREIGN PATENT DOCUMENTS

FR    2 074 302    10/1971

OTHER PUBLICATIONS

Nicholas Chironis "Design of Novikov Gears," *Product Engineering*, pp. 682-603 (Sep. 17, 1962).

(Continued)

*Primary Examiner*—Richard W. Ridley
*Assistant Examiner*—Justin Mitchell Krause
(74) *Attorney, Agent, or Firm*—Akin Gump Strauss Hauer & Feld, LLP (57) ABSTRACT

A gear system which includes a pinion and mating-gear forming a gear pair with a predetermined gear ratio ($m_G$), center distance (C), face-width ($F_w$), and limiting stresses. The pinion has a pinion tooth number ($N_1$) and a first plurality of teeth, each tooth having a first-tooth profile. The mating gear has a mating-gear tooth number ($N_2$) satisfying the expression $N_2 = m_G \cdot N_1$ and a second plurality of teeth, each tooth having a second-tooth profile. The relative curvature of the first-tooth profile and the second-tooth profile is given by the expression $k_c \cdot F_c$, where $F_c$ is a relative reference curvature function given by the expression $F_c = (N_1+N_2)^2/(N_1 \cdot N_2 \cdot C)$, and $k_c$ is a relative curvature multiplier which is a function of the gear ratio ($m_G$), the center distance (C), the face-width ($F_w$), and the limiting stresses.

24 Claims, 2 Drawing Sheets

U.S. PATENT DOCUMENTS

| | | |
|---|---|---|
| 2,951,053 A | 8/1960 | Reuter et al. |
| 2,955,481 A | 10/1960 | Jackel |
| 2,990,724 A | 7/1961 | Anderson et al. |
| 3,180,172 A | 4/1965 | Leggatt |
| 3,232,134 A | 2/1966 | Kluwe et al. |
| 3,251,236 A | 5/1966 | Wildhaber |
| 3,371,552 A | 3/1968 | Soper |
| 3,533,300 A | 10/1970 | Studer |
| 3,631,736 A | 1/1972 | Saari |
| 3,693,225 A | 9/1972 | Wildhaber |
| 3,709,055 A | 1/1973 | Grove |
| 3,855,874 A | 12/1974 | Honma et al. |
| 3,937,098 A | 2/1976 | Rouverol |
| 3,982,445 A | 9/1976 | Rouverol |
| 4,031,770 A | 6/1977 | Ishikawa |
| 4,051,745 A | 10/1977 | Ishikawa |
| 4,108,047 A | 8/1978 | Frankiw |
| 4,121,481 A | 10/1978 | Riegler et al. |
| 4,640,149 A | 2/1987 | Drago |
| 4,651,588 A | 3/1987 | Rouverol |
| 5,098,231 A | 3/1992 | Haug |
| 5,271,289 A | 12/1993 | Baxter, Jr. |
| 5,546,824 A | 8/1996 | Miller et al. |
| 5,605,518 A | 2/1997 | Kogure et al. |
| 6,101,892 A | 8/2000 | Berlinger, Jr. et al. |
| 6,178,840 B1 | 1/2001 | Colbourne et al. |
| 2002/0134184 A1* | 9/2002 | Hawkins ..................... 74/457 |
| 2003/0198526 A1* | 10/2003 | Colbourne ..................... 409/1 |

OTHER PUBLICATIONS

J.R. Colbourne "The Contact Stress in Novikov Gears," *Mech. Mach. Theory*, 24(3):223-229 (1989).

Darle W. Dudley, Gear Handbook—"The Design, Manufacture and Application of Gears," pp. 1-5 to 1-7 (1962).

"Gear Nomenclature (Geometry) Terms, Definitions, Symbols and Abbreviations", AGMA Standard, pp. 1-20 (Jun. 1976); and.

Earle Buckingham "Analytical Mechanics of Gears," pp. 18-23, McGraw-Hill, New York, 1949, republished by Dover Publications, Inc., New York, 1963.

\* cited by examiner

GEAR TOOTH PROFILE CURVATURE

CROSS-REFERENCE TO RELATED APPLICATIONS

This application is related to U.S. Provisional Patent Application No. 60/530,752, filed Dec. 18, 2003, and claims the earlier filing date of the provisional application which is incorporated herein by reference.

BACKGROUND OF THE INVENTION

The present invention relates to the construction of profiles of conjugate gears. In particular, the present invention relates to the construction of profiles of conjugate gears having a relative curvature which is a function of gear ratio, face-width factor, center distance and limiting stresses.

In U.S. Pat. No. 6,101,892, incorporated herein by reference, three methods were described for specifying the curvatures of conjugate tooth profiles. If $s$, $\phi$ are the polar coordinates of points on the path of contact, and $\rho_1$, $\rho_2$ are the profile radii of curvature at the corresponding points on the tooth profiles, these methods can be stated as follows:

$$1/\rho_1 + 1/\rho_2 = \text{Constant} \quad (1)$$

$$(1/\rho_1 + 1/\rho_2)/\cos\phi = \text{Constant} \quad (2)$$

$$f(s,\phi,\rho_1,\rho_2) = \text{Constant} \quad (3)$$

The first method can be described as constant relative curvature. The second method is suitable for spur gears, and is intended to provide constant contact stress. In the third method, f can be any function, specified by the designer of the tooth profiles. For conventional gears, such as involute gears, if the load intensity is known, i.e. the tooth force per unit length of the contact curve, then the tooth stresses can be found by conventional, well known methods.

However, finding the load intensity for a given torque is more difficult for Convoloid gears than for involute. In an involute gear pair, the contact curves are straight lines, and at every point of a contact line the normal to the tooth surface points in the same direction, so that for a given torque the load intensity is inversely proportional to the total length of the contact lines. The maximum load intensity is found when the total length of the contact lines is a minimum, and this occurs when one contact line passes through a corner of the contact region.

In a Convoloid gear pair, by contrast, the contact curves are not exactly straight, the normals do not point in exactly the same direction, and the contact curves are broken where they cross the transition zone. Hence, the load intensity is not inversely proportional to the total length of the contact curves, and the position of the contact curves for maximum load intensity is not known.

Accordingly, it is desirable to design Convoloid gear pairs having a relative curvature for which the maximum stresses approach but do not exceed the limiting stresses.

BRIEF SUMMARY OF THE INVENTION

Briefly stated, one embodiment of the present invention is directed to a gear system comprising a pinion and a mating gear. The pinion has a pinion tooth number ($N_1$), a pinion pitch circle radius ($R_{p1}$) and a first plurality of teeth, each tooth having a first-tooth profile. The mating gear has a mating-gear tooth number ($N_2$), a mating-gear pitch circle radius ($R_{p2}$), and a second plurality of teeth, each tooth having a second-tooth profile. The pinion and the mating gear form a gear pair having a gear ratio ($m_G$) equal to $N_2/N_1$, a face width ($F_w$) and a face-width factor ($f_w$) equal to $(2 \cdot R_{p2})/F_w$. The relative curvature of the first-tooth profile and the second-tooth profile is a multiple of a reference relative curvature ($K_{ref}$), the multiple given by the expression $K_m \cdot K_{ref}$, where $$K_{ref} = \frac{1}{\sin(20)} \cdot \left(\frac{1}{R_{p1}} + \frac{1}{R_{p2}}\right)$$

and $K_m$ is a relative curvature multiplier that is more than $a_{i,j} - \delta$ and less than $a_{i,j} + 2\delta$, where $\delta$ is about 0.15 and $a_{i,j}$ is given by a predetermined relationship between the gear ratio ($m_G$) and the face-width factor ($f_w$). The predetermined relationship corresponding to at least one relative curvature multiplier value in a relative curvature multiplier value table having the following properties:

| | Face Width Factor ($f_w$) | | |
|---|---|---|---|
| Gear Ratio ($m_G$) | 4.0 | 5.0 | 6.0 |
| 1.0 | 0.41 | 0.40 | 0.39 |
| 1.5 | 0.43 | 0.41 | 0.40 |
| 2.0 | 0.43 | 0.43 | 0.41 |
| 2.5 | 0.48 | 0.45 | 0.41 |
| 3.0 | 0.48 | 0.48 | 0.44 |
| 4.0 | 0.48 | 0.48 | 0.48 |
| 6.0 | 0.46 | 0.46 | 0.46 |
| 16.0 | 0.43 | 0.43 | 0.43 |

Another embodiment of the present invention is directed to a gear system comprising a pinion and a mating gear. The pinion has a pinion tooth number ($N_1$), a pinion pitch circle radius ($R_{p1}$) and a first plurality of teeth, each tooth having a first-tooth profile. The mating gear has a mating-gear tooth number ($N_2$), a mating-gear pitch circle radius ($R_{p2}$), and a second plurality of teeth, each tooth having a second-tooth profile. The pinion and the mating gear form a gear pair having a center distance (C) equal to ($R_{p1} + R_{p2}$), gear ratio ($m_G$) equal to $N_2/N_1$, a face width ($F_w$) and a face-width factor ($f_w$) equal to $(2 \cdot R_{p2})/F_w$. The relative curvature of the first-tooth profile and the second-tooth profile is given by the expression $k_c \cdot F_c$ where $F_c$ is a relative reference curvature function given by the expression $F_c = (N_1 + N_2)^2/(N_1 \cdot N_2 \cdot C)$ and $k_c$ is a relative curvature multiplier that is more than $b_{i,j} - \delta$ and less than $b_{i,j} + 2\delta$, where $\delta$ is about 0.439 and $b_{i,j}$ is given by a predetermined relationship between the gear ratio ($m_G$) and the face-width factor ($f_w$). The predetermined relationship corresponds to at least one relative curvature multiplier value in a relative curvature multiplier value table having the following properties:

| | Face Width Factor ($f_w$) | | |
|---|---|---|---|
| Gear Ratio ($m_G$) | 4.0 | 5.0 | 6.0 |
| 1.0 | 1.199 | 1.170 | 1.140 |
| 1.5 | 1.257 | 1.199 | 1.170 |
| 2.0 | 1.257 | 1.257 | 1.199 |
| 2.5 | 1.403 | 1.316 | 1.199 |
| 3.0 | 1.403 | 1.403 | 1.286 |
| 4.0 | 1.403 | 1.403 | 1.403 |
| 6.0 | 1.345 | 1.345 | 1.345 |
| 16.0 | 1.257 | 1.257 | 1.257 |

Another embodiment of the present invention is directed to a gear system having a predetermined gear ratio ($m_G$), a predetermined center distance (C), a predetermined face width ($F_w$), and predetermined limiting stresses. The gear system comprises a pinion and a mating gear. The pinion has a pinion tooth number ($N_1$), and a first plurality of teeth, each tooth having a first-tooth profile. The mating gear has a mating-gear tooth number ($N_2$) satisfying the expression $N_2 = m_G \cdot N_1$, and a second plurality of teeth, each tooth having a second-tooth profile. The pinion and the mating gear form a gear pair having a face-width factor ($f_w$) equal to $(2 \cdot N_2 \cdot C)/((N_1+N_2) \cdot F_w)$. The relative curvature of the first-tooth profile and the second-tooth profile is a multiple of a reference relative curvature ($K_{ref}$), the multiple given by the expression $K_m \cdot K_{ref}$, wherein the relative curvature of the first-tooth profile and the second-tooth profile is given by the expression $k_c \cdot F_c$ where $F_c$ is a relative reference curvature function given by the expression $F_c = (N_1+N_2)^2/(N_1 \cdot N_2 \cdot C)$ and $k_c$ is a relative curvature multiplier where $k_c$ is determined by a process comprising the following steps: (a) determining a plurality of load intensities for a predetermined input torque, each load intensity being associated with a unique angular position of a plurality of angular positions of the pinion, the plurality of angular positions spanning one angular pitch of the pinion, each load intensity based on a trial relative curvature multiplier ($k'_c$); (b) determining a plurality of tooth stresses corresponding to a greatest load intensity of the plurality of load intensities; (c) scaling the greatest load intensity to a scaled load intensity such that one tooth stress of the plurality of tooth stresses approaches one of the predetermined limiting stresses; (d) determine a limiting torque corresponding to the scaled load intensity; (e) repeating steps (a)–(d) for a plurality of trial relative curvature multipliers ($k'_c$) within a predetermined range of trial relative curvature multiplier values and selecting as relative curvature multiplier ($k_c$) the trial relative curvature multiplier ($k'_c$) corresponding to the limiting torque having the greatest value.

Another preferred embodiment of the present invention is a gear system having a predetermined gear ratio ($m_G$), a predetermined center distance (C), a predetermined face-width ($F_w$), and predetermined limiting stresses. The gear system comprising a pinion and a mating gear. The pinion has a pinion tooth number ($N_1$), and a first plurality of teeth, each tooth having a first-tooth profile. The mating gear has a mating-gear tooth number ($N_2$) satisfying the expression $N_2 = m_G \cdot N_1$, and a second plurality of teeth, each tooth having a second-tooth profile. The pinion and the mating gear form a gear pair having a face-width factor ($f_w$) equal to $(2 \cdot N_2 \cdot C)/((N_1+N_2) \cdot F_w)$. The relative curvature of the first-tooth profile and the second-tooth profile is given by an expression $k_c \cdot F_c$, where $F_c$ is a relative reference curvature function given by the expression $F_c = (N_1+N_2)^2/(N_1 \cdot N_2 \cdot C)$, and where $k_c$ is a relative curvature multiplier which is a function of the gear ratio ($m_G$), the face-width factor ($f_w$), the center distance (C), and one of the limiting stresses.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
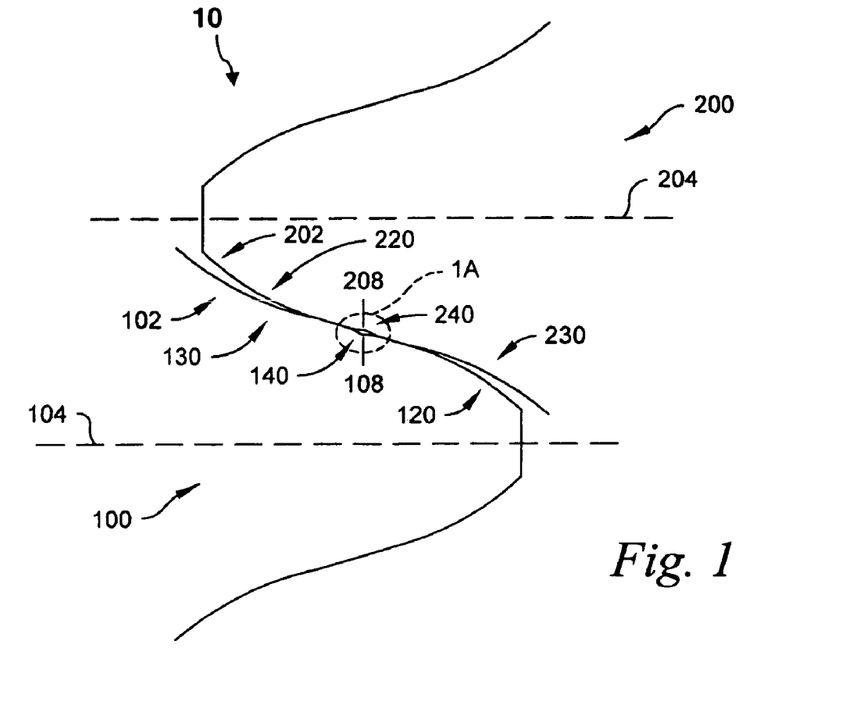
FIG. 1 is a view in a transverse plane of gear tooth profiles of a pinion tooth mated with a mating gear tooth in accordance with a preferred embodiment of the present invention.
Figure 1A:
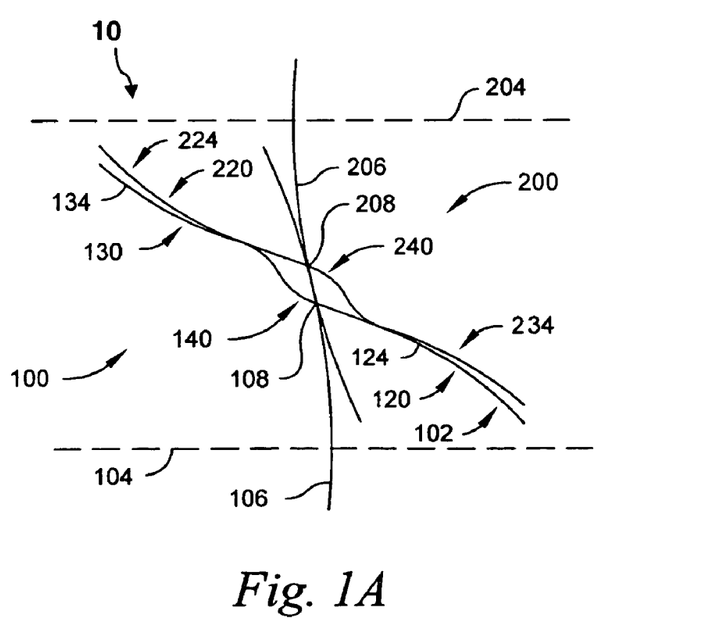
FIG. 1A is an enlarged view of the transition zones in FIG. 1.

Referring to FIGS. 1–1A, there is shown in a transverse plane the gear tooth profiles of a gear system, generally designated 10, and hereinafter referred to as the gear system 10 in accordance with the present invention.

A preferred embodiment of the gear system 10 having a relative curvature consistent with the present invention comprises a pinion 100 and a mating gear 200. The pinion 100 has a first plurality of teeth. Each tooth of the first plurality of teeth has a first-tooth profile 102. The first-tooth profile 102 has a first-tooth-profile centerline 104 and intersects a pinion pitch circle 106 at the first-tooth-profile pitch point 108. The pinion pitch circle 106 has a pinion pitch circle radius ($R_{p1}$). The first-tooth profile 102 includes a first transition zone 140 disposed between a first concave portion 134 lying within the dedendum 130 of the pinion 100 and a first convex portion 124 lying within the addendum 120 of the pinion 100. The pinion 100 has a pinion tooth number ($N_1$) corresponding to the number of teeth in the first plurality of teeth.

The mating gear 200 has a second plurality of teeth. Each tooth of the second plurality of teeth has a second-tooth profile 202. The second-tooth profile 202 has a second-tooth-profile centerline 204 and intersects a mating-gear pitch circle 206 at the second-tooth-profile pitch point 208. The mating-gear pitch circle 206 has a mating-gear pitch circle radius ($R_{p2}$). The second-tooth profile 202 includes a second transition zone 240 disposed between a second concave portion 234 lying within the dedendum 230 of the mating gear 200, and a second convex portion 224 lying within the addendum 220 of the mating gear 200. The second concave portion 234 is conjugate to the first convex portion 124 of the first tooth profile 102 of the first plurality of teeth of the pinion 100. The second convex portion 224 is conjugate to the first concave portion 134 of the first-tooth profile 102 of the first plurality of teeth of pinion 100. The mating gear 200 has a mating-gear tooth number ($N_2$) corresponding to the number of teeth in the second plurality of teeth.

The pinion 100 and the mating gear 200 form a gear pair having a gear ratio ($m_G$) equal to $N_2/N_1$, a center distance (C), a face width ($F_w$), and a face-width factor ($f_w$) equal to $(2 \cdot R_{p2})/F_w$.

The relative curvature for the first and second tooth profiles 102, 202 may be represented by the following equation:

$$\kappa_1 + \kappa_2 = Ae^{-B\xi\xi} \tag{4}$$

where $$\xi = s \sin \phi/m_n \tag{5}$$

$\kappa_1$ and $\kappa_2$ are the profile curvatures, equal to the reciprocals of the radii of curvature, A and B are constants chosen by the user, $m_n$ is the normal module, and $\xi$ is a dimensionless coordinate along the line of centers, with origin at the pitch point. The user specifies the relative curvatures at $\xi=-1$, $\xi=0$, and $\xi=1$, so that there will be one pair of values for A and B in the pinion dedendum, and a different pair in the addendum.

Studies have been carried out to determine the optimum input values for many gear pairs. Since the results for one gear pair can be scaled up or down, the center distance is not a factor. The gear pairs have been specified by their tooth numbers and by their face-width factor, which is defined as the pitch diameter of the gear divided by the face-width.

The results of the studies show that the lowest load intensities are found when the three input relative curvatures are either all equal, or are very similar in value. For this reason, the function given above in Equation (4) is no longer used, and the relative curvature is specified as a constant throughout the meshing cycle. Accordingly, the relative curvature of the first-tooth profile 102 and the second-tooth profile 202 is a multiple of a first preferred reference relative curvature ($K_{ref}$), the multiple given by the expression $K_m \cdot K_{ref}$ where $K_m$ is a relative curvature multiplier.

The reference relative curvature ($K_{ref}$) is the relative curvature at the pitch point of a 20 degree pressure angle spur gear pair, having the same tooth numbers and center distance as the gear pair being considered, and is given by the Euler-Savary equation. Accordingly, $$K_{ref} = \frac{1}{\sin(20)} \cdot \left( \frac{1}{R_{p1}} + \frac{1}{R_{p2}} \right)$$

The procedure shown in FIG. 2, discussed below in detail, has been used to calculate the limiting torques corresponding to the relative curvature multiplier ($K_m$) for the following combinations of cases based on the above reference relative curvature ($K_{ref}$):

| | |
|---|---|
| Gear ratios ($m_G$): | 1.0, 1.5, 2.0, 2.5, 3.0, 4.0, 6.0, 16.0. |
| Face-width factors ($f_w$): | 4.0, 5.0, 6.0. |

For each combination of the above gear ratios ($m_G$) and face-width factors ($f_w$), the pinion tooth number ($N_1$) and the relative curvature multiplier ($K_m$) were determined which give the greatest limiting torque. The relative curvature multipliers ($K_m$) are shown in Table 1.

TABLE 1

Relative Curvature Multipliers ($K_m$)

| | Face Width Factor ($f_w$) | | |
|---|---|---|---|
| Gear Ratio ($m_G$) | 4.0 | 5.0 | 6.0 |
| 1.0 | 0.41 | 0.40 | 0.39 |
| 1.5 | 0.43 | 0.41 | 0.40 |
| 2.0 | 0.43 | 0.43 | 0.41 |
| 2.5 | 0.48 | 0.45 | 0.41 |
| 3.0 | 0.48 | 0.48 | 0.44 |
| 4.0 | 0.48 | 0.48 | 0.48 |
| 6.0 | 0.46 | 0.46 | 0.46 |
| 16.0 | 0.43 | 0.43 | 0.43 |

The pinion tooth numbers ($N_1$) corresponding to the multipliers shown in Table 1 are shown in Table 2.

TABLE 2

Pinion Tooth Number ($N_1$)

| | Face Width Factor ($f_w$) | | |
|---|---|---|---|
| Gear Ratio ($m_G$) | 4.0 | 5.0 | 6.0 |
| 1.0 | 18 | 22 | 28 |
| 1.5 | 12 | 16 | 18 |
| 2.0 | 14 | 11 | 14 |
| 2.5 | 14 | 10 | 12 |
| 3.0 | 14 | 13 | 10 |
| 4.0 | 13 | 13 | 12 |
| 6.0 | 13 | 13 | 13 |
| 16.0 | 11 | 11 | 12 |

For gear pairs whose gear ratio ($m_G$) and face-width factor ($f_w$) lie between the numbers in the table, the relative curvature multiplier ($K_m$) may be determined by linear interpolation. For example, if the gear ratio ($m_G$) is 1.4 and the face-width factor ($f_w$) is 4.3, the relative curvature multiplier ($K_m$) may be found as follows:

($K_m$)=0.2 (0.7*0.41+0.3*0.40)+0.8 (0.7*0.43+0.3*0.41)=0.4206

For gear pairs with a face-width factor ($f_w$) less than 4.0, the relative curvature multiplier ($K_m$) is set equal to the value that would be obtained if the face-width factor ($f_w$) were 4.0. For gear pairs with a face-width factor ($f_w$) more than 6.0, the relative curvature multiplier ($K_m$) is set equal to the value that would be obtained if the face-width factor ($f_w$) were 6.0. For any gear pair with a gear ratio ($m_G$) greater than 16.0, the relative curvature multiplier ($K_m$) is set equal to 0.43.

For gear pairs with pinion tooth numbers ($N_1$) that are different from those in Table 2, the relative curvature multipliers ($K_m$) in Table 1 may still be used. The result will not be optimum, in that the limiting torque will be less than the value when the pinion tooth numbers ($N_1$) from Table 2 are used.

For relative curvature multipliers ($K_m$) above those given in Table 1, the limiting torque decreases slowly. For relative curvature multipliers ($K_m$) below those in the Table 1, the limiting torque sometimes decreases, or alternatively the limiting torque may increase but the profile contact ratio falls below 1.0. Gear pairs with a profile contact ratio less than 1.0 are not generally considered acceptable, but since the gears are helical they may be adequate, in that they still provide a constant angular velocity ratio. It is evident that relative curvature multipliers ($K_m$) both above and below those in Table 1 may be used to design satisfactory gear pairs. For this reason, this disclosure covers a range of relative curvature multipliers ($K_m$), extending from 0.15 below the values in Table 1, to 0.30 above the table values.

For relative curvature multipliers ($K_m$) below the lower limit set forth above, the profile contact ratio is less than 0.85, which means that the gear pair is most likely unacceptable. For relative curvature multipliers ($K_m$) above the upper limit, the limiting torque is 80% or less of the limiting torque when the relative curvature multipliers ($K_m$) given in Table 1 are used.

For the above reasons, the range of possible relative curvature multiplier ($K_m$) has been determined to be more than $a_{i,j} - \delta$ and less than $a_{i,j} + 2\delta$, where $\delta$ is about 0.15 and $a_{i,j}$ corresponds to at least one relative curvature multiplier value in Table 1.

The relative curvature of the first-tooth profile 102 and the second-tooth profile 202 also may be given alternatively by the expression $k_c \cdot F_c$ where $F_c$ is a relative reference curvature function given by the expression $F_c=(N_1+N_2)^2/(N_1 \cdot N_2 \cdot C)$ and $k_c$ is a relative curvature multiplier that is more than $b_{i,j}-\delta$ and less than $b_{i,j}+2\delta$, where $\delta$ is about 0.439 and $b_{i,j}$ is given by a predetermined relationship between the gear ratio ($m_G$) and the face-width factor ($f_w$). The predetermined relationship corresponds to at least one relative curvature multiplier value in a relative curvature multiplier value table having the following properties:

TABLE 3

Relative Curvature Multipliers ($k_c$)

| Gear Ratio ($m_G$) | Face Width Factor ($f_w$) | | |
|---|---|---|---|
| | 4.0 | 5.0 | 6.0 |
| 1.0 | 1.199 | 1.170 | 1.140 |
| 1.5 | 1.257 | 1.199 | 1.170 |
| 2.0 | 1.257 | 1.257 | 1.199 |
| 2.5 | 1.403 | 1.316 | 1.199 |
| 3.0 | 1.403 | 1.403 | 1.286 |
| 4.0 | 1.403 | 1.403 | 1.403 |
| 6.0 | 1.345 | 1.345 | 1.345 |
| 16.0 | 1.257 | 1.257 | 1.257 |

For gear pairs with a face-width factor ($f_w$) less than 4.0, the relative curvature multiplier ($k_c$) is set equal to the value that would be obtained if the relative curvature multiplier ($k_c$) were 4.0. For gear pairs with a face-width factor ($f_w$) more than 6.0, the relative curvature multiplier ($k_c$) is set equal to the value that would be obtained if the relative curvature multiplier ($k_c$) were 6.0. For any gear pair with a gear ratio greater than 16.0, the relative curvature multiplier ($k_c$) is set equal to 1.257. For gear pairs with a gear ratio or face-width factor that lies between the numbers in the table, interpolation, preferably linear based on at least one or two relative curvature multiplier values, is used to determine the relative curvature multiplier ($k_c$).

As an alternative to determining the value for the relative curvature multiplier ($k_c$) by table look-up when the values for face width ($F_w$), pinion tooth number ($N_1$), pinion pitch circle radius ($R_{p1}$), mating-gear tooth number ($N_2$), and mating-gear pitch circle radius ($R_{p2}$) are predetermined, the relative curvature multiplier ($k_c$) may be determined by the five step process discussed below.

Figure 2:
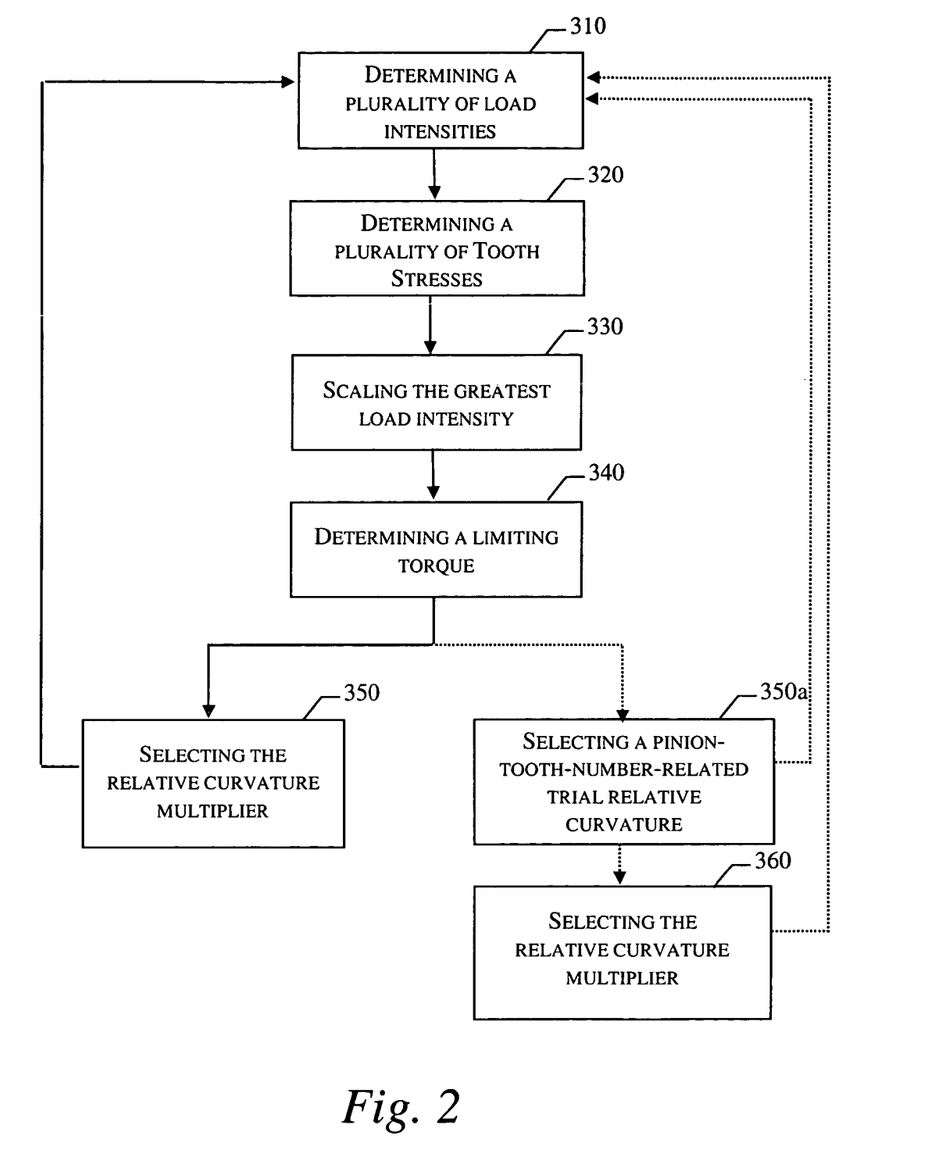
FIG. 2 is a diagram of a preferred process for determining the relative curvature multiplier for the relative curvature of the first and second tooth profiles of the pinion and mating gear teeth of FIG. 1.

Referring to FIG. 2, the determination of the relative curvature multiplier ($k_c$) comprises a multi-step procedure involving well known methods for determining tooth profiles, contact curves, load intensities, tooth stresses and the like. The methods by which these features or parameters are determined have been described by Buckingham, ANALYTICAL MECHANICS OF GEARS, McGRaw-Hill, 1949, republished by Dover, N.Y., 1963, incorporated in its entirety herein and U.S. Pat. No. 6,101,892, also incorporated in its entirety herein and for brevity are not discussed herein. Since a procedure similar to the below procedure may be used to determine the relative curvature multipliers ($K_m$), for brevity, the determination of the relative curvature multipliers ($K_m$) also is not discussed.

Referring to FIG. 2, a first step 310 in determining the relative curvature multiplier ($k_c$) comprises determining a plurality of load intensities for a predetermined input torque. Each load intensity is associated with a unique angular position of a plurality of angular positions of the pinion 100. The plurality of angular positions span one angular pitch of the pinion 100. Each load intensity is based on the pinion tooth number ($N_1$) and a trial relative curvature multiplier ($k'_c$).

More specifically, in step 310, the face-width factor $f_w=(2 \cdot R_{p2})/F_w$ and the relative reference curvature function $F_c=(N_1+N_2)^2/(N_1 \cdot N_2 \cdot C)$ are determined. A value for the trial relative curvature multiplier ($k'_c$) within a predetermined range, for example $0.7 \leq k'_c \leq 2.3$, is assumed and the first and second tooth profiles 102, 202 are determined in accordance with the teachings of U.S. Pat. No. 6,101,892. A value, for example 10,000 in-lbs, is assumed for an input torque ($\tau_{input}$). A plurality of angular positions spanning one angular pitch of the pinion 100 are identified. For each angular position of the plurality of angular positions the positions of the contact curves are calculated and the contact curves are divided into a plurality of small increments. Preferably, the number of increments in the plurality of small increments is greater than 200 increments and less than 500 increments in each contact curve and is based on the desired accuracy of the computations. An arbitrary value, for example 1,000 lbs/in, for the load intensity is assumed and a torque contribution of a contact force at each increment is determined. The torque contributions are summed to obtain a total torque corresponding to the assumed load intensity. The assumed load intensity is then scaled so that the total torque is equal to the assumed input torque ($\tau_{input}$). The procedure for determining a scaled load intensity corresponding to the total torque is repeated for each angular position of the pinion and the greatest load intensity is selected for further processing.

A second step 320 comprises determining a plurality of tooth stresses, e.g., a contact stress, a pinion fillet stress, and a mating-gear fillet stress, corresponding to a greatest load intensity of the plurality of load intensities.

A third step 330 comprises scaling the greatest load intensity to a scaled load intensity such that one tooth stress of the plurality of tooth stresses approaches a predetermined limiting stress that is a characteristic of the material from which the gear pair is fabricated.

A fourth step 340 comprises determining a limiting torque corresponding to the scaled load intensity. The corresponding limiting torque is equal to the limiting torque for the gear pair for the trial relative curvature multiplier ($k'_c$) assumed in first step 310.

A fifth step 350 comprises repeating the first through fourth steps 310–340 for a plurality of trial relative curvature multipliers ($k'_c$) within the predetermined range of trial relative curvature multiplier values and selecting as the relative curvature multiplier ($k_c$) the trial relative curvature multiplier ($k'_c$) corresponding to the limiting torque having the greatest value.

As an alternative to determining the value for the relative curvature multiplier ($k_c$) by table look-up when the values for gear ratio ($m_G$), the center distance (C), face width ($F_w$), and the limiting stresses are predetermined, the relative curvature multiplier ($k_c$) may be determined by the five step procedure discussed above as modified below.

In the first step 310, the pinion tooth number ($N_1$) is set equal to a trial pinion tooth number ($N'_1$).

In the fifth step 350a, the first through fourth steps 310–340 are repeated for a plurality of trial relative curvature multipliers ($k'_c$) within a predetermined range of trial relative curvature multiplier values and the trial relative curvature multiplier ($k'_c$) corresponding to the limiting torque having the greatest value is selected as a pinion-tooth-number-related trial relative curvature multiplier ($k''_c$).

A sixth step 360 is added. The sixth step 360 repeats the first through fifth steps 310–350 for a plurality of trial pinion tooth numbers (N'$_1$) within a predetermined range of trial pinion tooth numbers, for example 10≦N'$_1$≦30, and the pinion-tooth-number-related trial relative curvature multiplier (k''$_c$) corresponding to the limiting torque having the greatest value is selected as the relative curvature multiplier (k$_c$).

Those skilled in the art will understand that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A gear system comprising:
a pinion having a pinion tooth number (N$_1$), a pinion pitch circle radius (R$_{p1}$), and a first plurality of teeth, each tooth having a first-tooth profile; and
a mating gear having a mating-gear tooth number (N$_2$), a mating-gear pitch circle radius (R$_{p2}$), and a second plurality of teeth, each tooth having a second-tooth profile,
wherein the pinion and the mating gear form a gear pair having a gear ratio (m$_G$) equal to N$_2$/N$_1$, a face width (F$_w$) and a face-width factor (f$_w$) equal to (2·R$_{p2}$)/F$_w$, and
wherein the relative curvature of the first-tooth profile and the second-tooth profile is a multiple of a reference relative curvature (K$_{ref}$), the multiple defined by the expression K$_m$·K$_{ref}$, where $$K_{ref} = \frac{1}{\sin(20)} \cdot \left(\frac{1}{R_{p1}} + \frac{1}{R_{p2}}\right)$$

and K$_m$ is a relative curvature multiplier that is more than a$_{i,j}$−δ and less than a$_{i,j}$+2δ, where δ is between 0 and 0.15 and a$_{i,j}$ is defined by a predetermined relationship between the gear ratio (m$_G$) and the face-width factor (f$_w$), the predetermined relationship corresponding to at least one relative curvature multiplier value in a relative curvature multiplier value table having the following properties:

|  | Face Width Factor (f$_w$) | | |
|---|---|---|---|
| Gear Ratio (m$_G$) | 4.0 | 5.0 | 6.0 |
| 1.0 | 0.41 | 0.40 | 0.39 |
| 1.5 | 0.43 | 0.41 | 0.40 |
| 2.0 | 0.43 | 0.43 | 0.41 |
| 2.5 | 0.48 | 0.45 | 0.41 |
| 3.0 | 0.48 | 0.48 | 0.44 |
| 4.0 | 0.48 | 0.48 | 0.48 |
| 6.0 | 0.46 | 0.46 | 0.46 |
| 16.0 | 0.43 | 0.43 | 0.43. |

2. The gear system of claim 1, wherein the relative curvature multiplier (k$_c$) when the face-width factor (f$_w$) is less than 4.0 corresponds to the relative curvature multiplier (k$_c$) when the face-width factor (f$_w$) is equal to 4.0.

3. The gear system of claim 1, wherein the relative curvature multiplier (K$_m$) when the face-width factor (f$_w$) is more than 6.0 corresponds to the relative curvature multiplier (K$_m$) when the face-width factor (f$_w$) is equal to 6.0.

4. The gear system of claim 1, wherein the relative curvature multiplier (K$_m$) corresponds to an interpolated value based on at least two relative curvature multiplier values in the relative curvature multiplier value table.

5. The gear system of claim 1, wherein δ is equal to zero.

6. The gear system of claim 5, wherein the relative curvature multiplier (K$_m$) corresponds to an interpolated value based on at least two relative curvature multiplier values in the relative curvature multiplier value table.

7. The gear system of claim 1, wherein the first-tooth profile includes a first transition zone disposed between a first concave portion lying within the dedendum of the pinion and a first convex portion lying within the addendum of the pinion, and the second-tooth profile includes a second transition zone disposed between a second concave portion lying within the dedendum of the mating gear, the second concave portion conjugate to the first convex portion of the first tooth profile of the first plurality of teeth of the pinion, and a second convex portion lying within the addendum of the mating gear, the second convex portion conjugate to the first concave portion of the first-tooth profile of the first plurality of teeth of the pinion.

8. The gear system of claim 7, wherein the relative curvature multiplier (K$_m$) corresponds to an interpolated value based on at least two relative curvature multiplier values in the relative curvature multiplier value table.

9. The gear system of claim 7 wherein δ is equal to zero.

10. The gear system of claim 9, wherein the relative curvature multiplier corresponds to an interpolated value based on at least two relative curvature multiplier values in the relative curvature multiplier value table.

11. A gear system comprising:
a pinion having a pinion tooth number (N$_1$), a pinion pitch circle radius (R$_{p1}$) and a first plurality of teeth, each tooth having a first-tooth profile, the pinion; and
a mating gear having a mating-gear tooth number (N$_2$), a mating-gear pitch circle radius (R$_{p2}$) and a second plurality of teeth, each tooth having a second-tooth profile;
wherein the pinion and the mating gear form a gear pair having a center distance (C) equal to (R$_{p1}$+R$_{p2}$), a gear ratio (m$_G$) equal to N$_2$/N$_1$, a face width (F$_w$), and a face-width factor (f$_w$) equal to (2·R$_{p2}$)/F$_w$, and
wherein the relative curvature of the first-tooth profile and the second-tooth profile is defined by the expression k$_c$·F$_c$ where F$_c$ is a relative reference curvature function defined by the expression F$_c$=(N$_1$+N$_2$)$^2$/(N$_1$·N$_2$·C) and k$_c$ is a relative curvature multiplier that is more than b$_{i,j}$−δ and less than b$_{i,j}$+2δ where δ is between 0 and 0.439 " and b$_{i,j}$ is defined by a predetermined relationship between the gear ratio (m$_G$) and the face-width factor (f$_w$), the predetermined relationship corresponding to at least one relative curvature multiplier value in a relative curvature multiplier value table having the following properties:

|  | Face Width Factor (f$_w$) | | |
|---|---|---|---|
| Gear Ratio (m$_G$) | 4.0 | 5.0 | 6.0 |
| 1.0 | 1.199 | 1.170 | 1.140 |
| 1.5 | 1.257 | 1.199 | 1.170 |
| 2.0 | 1.257 | 1.257 | 1.199 |
| 2.5 | 1.403 | 1.316 | 1.199 |
| 3.0 | 1.403 | 1.403 | 1.286 |
| 4.0 | 1.403 | 1.403 | 1.403 |

-continued

| Gear Ratio ($m_G$) | Face Width Factor ($f_w$) | | |
|---|---|---|---|
| | 4.0 | 5.0 | 6.0 |
| 6.0 | 1.345 | 1.345 | 1.345 |
| 16.0 | 1.257 | 1.257 | 1.257. |

12. The gear system of claim 11, wherein the relative curvature multiplier ($k_c$) when the face-width factor ($f_w$) is less than 4.0 corresponds to the relative curvature multiplier ($k_c$) when the face-width factor ($f_w$) is equal to 4.0.

13. The gear system of claim 11, wherein the relative curvature multiplier ($k_c$) when the face-width factor ($f_w$) is more than 6.0 corresponds to the relative curvature multiplier ($k_c$) when the face-width factor ($f_w$) is equal to 6.0.

14. The gear system of claim 11, wherein the relative curvature multiplier ($k_c$) corresponds to an interpolated value based on at least two relative curvature multiplier values in the relative curvature multiplier value table.

15. The gear system of claim 11, wherein $\delta$ is equal to zero.

16. The gear system of claim 15, wherein the relative curvature multiplier ($k_c$) corresponds to an interpolated value based on at least two relative curvature multiplier values in the relative curvature multiplier value table.

17. The gear system of claim 11, wherein the first-tooth profile includes a first transition zone disposed between a first concave portion lying within the dedendum of the pinion and a first convex portion lying within the addendum of the pinion, and the second-tooth profile includes a second transition zone disposed between a second concave portion lying within the dedendum of the mating gear, the second concave portion conjugate to the first convex portion of the first tooth profile of the first plurality of teeth of the pinion, and a second convex portion lying within the addendum of the mating gear, the second convex portion conjugate to the first concave portion of the first-tooth profile of the first plurality of teeth of the pinion.

18. The gear system of claim 17, wherein the relative curvature multiplier ($k_c$) corresponds to an interpolated value based on at least two relative curvature multiplier values in the relative curvature multiplier value table.

19. The gear system of claim 17 wherein $\delta$ is equal to zero.

20. The gear system of claim 19, wherein the relative curvature multiplier ($k_c$) corresponds to an interpolated value based on at least two relative curvature multiplier values in the relative curvature multiplier value table.

21. A gear system having a predetermined gear ratio ($m_G$), a predetermined center distance (C), a predetermined face width ($F_w$), and predetermined limiting stresses, the gear system comprising:
a pinion having a pinion tooth number ($N_1$) and a first plurality of teeth, each tooth having a first-tooth profile; and
a mating gear having a mating-gear tooth number ($N_2$) satisfying the expression $N_2 = m_G \cdot N_1$ and a second plurality of teeth, each tooth having a second-tooth profile,
wherein the pinion and the mating gear form a gear pair having a face-width factor ($f_w$) equal to $(2 \cdot N_2 \cdot C)/((N_1 + N_2) \cdot F_w)$, and
wherein the relative curvature of the first-tooth profile and the second-tooth profile is defined by an expression $k_c \cdot F_c$ where $F_c$ is a relative reference curvature function defined by the expression $F_c = (N_1 + N_2)^2/(N_1 \cdot N_2 \cdot C)$, and $k_c$ is a relative curvature multiplier where $k_c$ is determined by a process comprising the following steps:
(a) determining a plurality of load intensities for a predetermined input torque, each load intensity being associated with a unique angular position of a plurality of angular positions of the pinion, the plurality of angular positions spanning one angular pitch of the pinion, each load intensity based on a trial relative curvature multiplier ($k'_c$);
(b) determining a plurality of tooth stresses corresponding to a greatest load intensity of the plurality of load intensities;
(c) scaling the greatest load intensity to a scaled load intensity such that one tooth stress of the plurality of tooth stresses approaches one of the predetermined limiting stresses;
(d) determine a limiting torque corresponding to the scaled load intensity; and
(e) repeating steps (a)–(d) for a plurality of trial relative curvature multipliers ($k'_c$) within a predetermined range of trial relative curvature multiplier values and selecting as relative curvature multiplier ($k_c$) the trial relative curvature multiplier ($k'_c$) corresponding to the limiting torque having the greatest value.

22. The gear system of claim 21, wherein the predetermined range of trial relative curvature multipliers is about 0.7 to 2.3.

23. A gear system having a predetermined gear ratio ($m_G$), a predetermined center distance (C), a predetermined face width ($F_w$), and predetermined limiting stresses, the gear system comprising:
a pinion having a pinion tooth number ($N_1$), and a first plurality of teeth, each tooth having a first-tooth profile; and
a mating gear having a mating-gear tooth number ($N_2$) satisfying the expression $N_2 = m_G \cdot N_1$ and a second plurality of teeth, each tooth having a second-tooth profile,
wherein the pinion and the mating gear form a gear pair having a face-width factor ($f_w$) equal to $(2 \cdot N_2 \cdot C)/((N_1 + N_2) \cdot F_w)$, and
wherein the relative curvature of the first-tooth profile and the second-tooth profile is defined by an expression $k_c \cdot F_c$,
where $F_c$ is a relative reference curvature function defined by the expression $$F_c = (N_1 + N_2)^2/(N_1 \cdot N_2 \cdot C),$$

and
where $k_c$ is a relative curvature multiplier which is a function of the gear ratio ($m_G$), the face-width factor ($f_w$), the center distance (C), and one of the limiting stresses.

24. The gear system according to claim 23, wherein the predetermined relationship is determined by a process comprising the following steps:
(a) determining a plurality of load intensities for a predetermined input torque, each load intensity being associated with a unique angular position of a plurality of angular positions of the pinion, the plurality of angular positions spanning one angular pitch of the gear pair, each load intensity based on a trial pinion tooth number ($N'_1$) and a trial relative curvature multiplier ($k'_c$);

(b) determining a plurality of tooth stresses corresponding to a greatest load intensity of the plurality of load intensities;
(c) scaling the greatest load intensity to a scaled load intensity such that one tooth stress of the plurality of tooth stresses approaches a predetermined limiting stress;
(d) determine a limiting torque corresponding to the scaled load intensity;
(e) repeating steps (a)–(d) for a plurality of trial relative curvature multipliers ($k'_c$) within a predetermined range of trial relative curvature multiplier values and selecting as a pinion-tooth-number-related trial relative curvature multiplier ($k''_c$) the trial relative curvature multiplier ($k'_c$) corresponding to the limiting torque having the greatest value; and
(f) repeating steps (a)–(e) for a plurality of trial pinion tooth numbers ($N'_1$) within a predetermined range of trial pinion tooth numbers and selecting as the relative curvature multiplier ($k_c$) the pinion-tooth-number-related trial relative curvature multiplier ($k''_c$) corresponding to the limiting torque having the greatest value.

* * * * *